(12) United States Patent
Hashimoto et al.

(10) Patent No.: US 11,663,420 B2
(45) Date of Patent: May 30, 2023

(54) DIALOGUE SYSTEM

(71) Applicant: NTT DOCOMO, INC., Chiyoda-ku (JP)

(72) Inventors: Takanori Hashimoto, Chiyoda-ku (JP); Hiroshi Fujimoto, Chiyoda-ku (JP); Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 372 days.

(21) Appl. No.: 17/044,023

(22) PCT Filed: Jan. 11, 2019

(86) PCT No.: PCT/JP2019/000773
§ 371 (c)(1),
(2) Date: Sep. 30, 2020

(87) PCT Pub. No.: WO2019/202787
PCT Pub. Date: Oct. 24, 2019

(65) Prior Publication Data
US 2021/0124879 A1    Apr. 29, 2021

(30) Foreign Application Priority Data
Apr. 17, 2018  (JP) .............................. JP2018-079078

(51) Int. Cl.
*G06F 40/35* (2020.01)
*G06F 16/332* (2019.01)
(Continued)

(52) U.S. Cl.
CPC .......... *G06F 40/35* (2020.01); *G06F 16/3329* (2019.01); *G06F 16/3344* (2019.01); *G06F 40/279* (2020.01); *G06F 40/268* (2020.01)

(58) Field of Classification Search
CPC .. G06F 40/35; G06F 16/3329; G06F 16/3344; G06F 40/279; G06F 40/268; G06F 16/2423; G06F 40/284
See application file for complete search history.

(56) References Cited

U.S. PATENT DOCUMENTS 5,619,410 A * 4/1997 Emori ................... G06F 40/247
                                                          707/E17.084
9,280,610 B2 * 3/2016 Gruber ................ G06F 16/9535
(Continued)

FOREIGN PATENT DOCUMENTS

JP    2006-244262 A    9/2006
JP    2015-36945 A     2/2015

OTHER PUBLICATIONS

International Preliminary Report on Patentability and Written Opinion dated Oct. 29, 2020 in PCT/JP2019/000773 (submitting English translation only), 9 pages.
(Continued)

*Primary Examiner* — Akwasi M Sarpong
(74) *Attorney, Agent, or Firm* — Oblon, McClelland, Maier & Neustadt, L.L.P.

(57) ABSTRACT

The dialogue system includes a ranking determination unit configured to determine a priority ranking of the resulting sentence candidates on the basis of a degree of coincidence between the input key group and the storage key group, and a presentation unit configured to present a response for prompting a user to make an additional input on the basis of a resulting sentence candidate of a highest priority ranking. In a case where there is the stored keyword which is in a predetermined correspondence relation with the character string, the keyword acquisition unit acquires the input keyword obtained by adding additional information to the stored keyword. In a case where the additional information is added to the input keyword, the ranking determination unit reduces
(Continued)

| CATEGORY | ID |
|---|---|
| PERFECT MATCH | 3, 2 |
| DEFICIENT MATCH | 7, 4, 6 |
| EXCESS MATCH | 8, 1 |
| EXCESS AND DEFICIENT MATCH | 9, 5 | an influence of the input keyword to which the additional information is added on the degree of coincidence.

9 Claims, 10 Drawing Sheets

(51) Int. Cl.
*G06F 16/33* (2019.01)
*G06F 40/279* (2020.01)
*G06F 40/268* (2020.01)

(56) References Cited

U.S. PATENT DOCUMENTS

| | | | | |
|---|---|---|---|---|
| 11,017,037 | B2* | 5/2021 | Andreica | G06F 9/453 |
| 11,049,493 | B2* | 6/2021 | Hiroe | G10L 13/00 |
| 11,101,037 | B2* | 8/2021 | Allen | G16H 40/67 |
| 11,170,166 | B2* | 11/2021 | Bellegarda | G06F 40/232 |
| 2007/0073533 | A1* | 3/2007 | Thione | G06F 40/35 |
| | | | | 704/9 |
| 2015/0066479 | A1* | 3/2015 | Pasupalak | G06F 16/90332 |
| | | | | 704/9 |
| 2015/0142420 | A1* | 5/2015 | Sarikaya | G10L 15/1815 |
| | | | | 704/9 |
| 2015/0293901 | A1* | 10/2015 | Bufe, III | G06F 16/90324 |
| | | | | 707/725 |
| 2015/0356089 | A1* | 12/2015 | Jamrog | G06F 16/24578 |
| | | | | 707/723 |
| 2016/0179801 | A1* | 6/2016 | Venkataraman | G06F 16/48 |
| | | | | 707/771 |
| 2016/0259863 | A1* | 9/2016 | Allen | G06F 40/211 |
| 2017/0315978 | A1* | 11/2017 | Boucher | G06F 3/0482 |
| 2018/0025075 | A1* | 1/2018 | Beller | G06F 16/3329 |
| | | | | 707/769 |
| 2018/0293221 | A1* | 10/2018 | Finkelstein | G06N 20/00 |
| 2018/0307676 | A1* | 10/2018 | Ben Shahar | G06F 40/56 |
| 2018/0330721 | A1* | 11/2018 | Thomson | G10L 15/1822 |
| 2018/0373840 | A1* | 12/2018 | Foti, Jr. | G16H 20/70 |
| 2019/0172444 | A1* | 6/2019 | Hiroe | G06F 40/268 |
| 2019/0362009 | A1* | 11/2019 | Miseldine | G06F 16/285 |
| 2020/0007380 | A1* | 1/2020 | Chen | H04L 51/02 |

OTHER PUBLICATIONS

Notice of Reasons for Refusal dated Sep. 14, 2021 in Japanese Patent Application No. 2020-513967 (with English language translation), 8 pages.
International Search Report dated Mar. 26, 2019 in PCT/JP2019/000773 filed on Jan. 11, 2019, 2 pages.

* cited by examiner

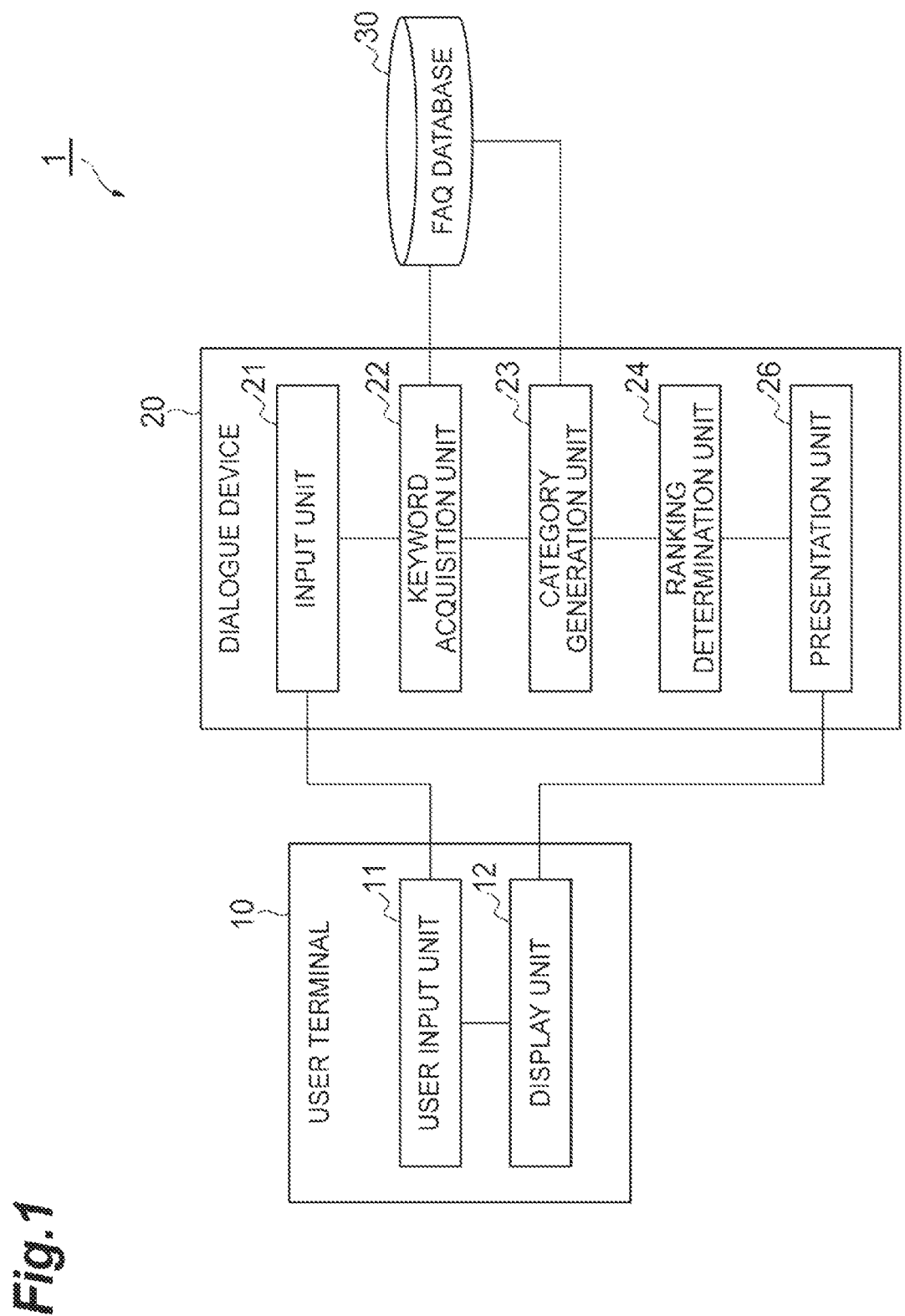

*Fig.2*

| QUESTION SENTENCE | STORAGE KEY GROUP | REPLY |
|---|---|---|
| 購入する方法 (How to purchase) | 購入、方法 (Purchase, how to (or method)) | ... |
| 既刊を購入する方法 (How to purchase already issued books) | 既刊、購入、方法 (Already issued, purchase, how to (or method)) | ... |
| 既刊を一括で購入する方法 (How to purchase already issued books in bulk) | 一括、既刊、購入、方法 (In bulk, already issued, purchase, how to) | ... |
| 購入について (About purchase) | 購入 (Purchase) | ... |
| 既刊について (About already issued books) | 既刊 (Already issued book) | ... |
| 新刊を購入する方法 (How to purchase new issue) | 購入、新刊、方法 (Purchase, new issue, how to (or method)) | ... |
| 新刊と既刊の同時購入について (Simultaneous purchase of new issue and already issued books) | 新刊、購入、新刊、同時 (New issue, purchase, new issue, simultaneous) | ... |
| 購入する方法と期間について (About how to purchase and period) | 期間、購入、方法 (Period, purchase, how to (or method)) | ... |

Fig. 3

| STORED KEYWORD | READING | SYNONYM | ERRONEOUS INPUT PATTERN |
|---|---|---|---|
| 既刊 (Already issued books) | きかん (Kikan) | | |
| 期間 (Period) | きかん (Kikan) | | |
| 起動 (Activate) | きどう (Kidou) | ブート (Boot) | |
| メール (Mail) | めーる (Meeru) | 電子郵便 (Electronic mail) | まい |

Fig.4

INPUT: A, B, C (FLUCTUATION FLAG)

| ID | STORAGE KEY GROUP | NUMBER OF MATCHES | NUMBER OF DEFICIENCIES | NUMBER OF EXCESSES |
|---|---|---|---|---|
| 1 | A | 1 | 0 | 1 |
| 2 | A, B | 2 | 0 | 0 |
| 3 | A, B, C | 2.5 | 0 | 0 |
| 4 | A, B, D | 2 | 1 | 0 |
| 5 | A, D, F, E | 1 | 3 | 1 |
| 6 | A, B, G, H, I, J, K | 2 | 5 | 0 |
| 7 | A, B, C, E, F | 2.5 | 2 | 0 |
| 8 | A, C | 1.5 | 0 | 1 |
| 9 | A, C, E, F | 1.5 | 2 | 1 |

Fig.5

| CATEGORY | ID |
|---|---|
| PERFECT MATCH | 3, 2 |
| DEFICIENT MATCH | 7, 4, 6 |
| EXCESS MATCH | 8, 1 |
| EXCESS AND DEFICIENT MATCH | 9, 5 |

DIALOGUE SYSTEM

TECHNICAL FIELD

The present invention relates to a dialogue system.

BACKGROUND ART

Patent Literature 1 discloses a system that selects a combination of frequently asked questions corresponding to questions input in natural sentences and replies thereto from an FAQ database. In this system, the priority ranking of frequently asked questions is determined depending on, for example, the number of occurrences of a keyword in a question which is input by a user, the position of the keyword, or the like. In addition, reverse questions (return questions) for narrowing down the content of questions are output on the basis of questions having a high priority ranking.

CITATION LIST

Patent Literature

[Patent Literature 1] Japanese Unexamined Patent Publication No. 2015-36945

SUMMARY OF INVENTION

Technical Problem

Incidentally, in the system as described above, keywords that differ in notation from keywords held by the system can be considered to be input due to a user's erroneous input or the like. In this case, it is not possible to specify the keywords in the system, and to correctly understand the user's question intention. Consequently, correcting fluctuation in the notations of input keywords or the like can be considered. However, in a case where such correction is not in line with a user's question intention, it may take time to narrow down questions.

An object of an aspect of the present invention is to provide a dialogue system which is capable of coping efficiently with an erroneous input or the like.

Solution to Problem

According to an aspect of the present invention, there is provided a dialogue system configured to perform a response for prompting a user to make an additional input with respect to the user's input of a character string and determine a resulting sentence corresponding to the user's input, the system including: a storage unit configured to store resulting sentence candidates which are candidates of the resulting sentence and a storage key group containing one or a plurality of stored keywords associated with the resulting sentence candidates; a keyword acquisition unit configured to acquire an input key group containing one or a plurality of input keywords associated with the character string on the basis of the input of the character string; a ranking determination unit configured to determine a priority ranking of the resulting sentence candidates on the basis of a degree of coincidence between the input key group and the storage key group; and a presentation unit configured to select a resulting sentence candidate of a highest priority ranking determined by the ranking determination unit and present a response for prompting the user to make an additional input on the basis of the selected resulting sentence candidate, wherein, in a case where there is the stored keyword which is in a predetermined correspondence relation with the character string, the keyword acquisition unit acquires the input keyword obtained by adding additional information to the stored keyword, and in a case where the additional information is added to the input keyword acquired by the keyword acquisition unit, the ranking determination unit reduces an influence of the input keyword to which the additional information is added on the degree of coincidence.

In the above-described dialogue system, when a character string is input by a user, the input key group is acquired by the keyword acquisition unit. In addition, the storage unit stores the storage key group associated with resulting sentence candidates. The ranking determination unit determines the priority ranking of the resulting sentence candidates on the basis of the degree of coincidence between the input key group and the storage key group. The dialogue system of an aspect can acquire an input keyword obtained by adding additional information to a stored keyword which is in a predetermined correspondence relation with the character string. That is, even if the user's erroneous input or the like is present, a stored keyword which is in a predetermined correspondence relation with an input character string can be acquired as an input keyword. The influence of the input keyword to which the additional information is added on the degree of coincidence is reduced more than other input keywords. Therefore, even in a case where the acquisition of the input keyword to which the additional information is added is not in line with the user's intention, a candidate question which is in line with the original intention is not buried. On the other hand, in a case where the acquisition of the input keyword to which the additional information is added is in line with the user's intention, the input keyword is reflected in the degree of coincidence, so that there is a tendency to reach resulting sentence candidates which are intended by the user. Thereby, it is possible to cope efficiently with the user's erroneous input or the like.

Advantageous Effects of Invention

According to an aspect of the present invention, it is possible to provide a dialogue system which is capable of coping efficiently with an erroneous input or the like.

BRIEF DESCRIPTION OF DRAWINGS

FIG. 1 is a block diagram illustrating a configuration of a dialogue system according to an embodiment.

FIG. 2 is a diagram illustrating an FAQ database.

FIG. 3 is a diagram illustrating a fluctuation dictionary.

FIG. 4 is a diagram illustrating a relationship between an input key group and a storage key group.

FIG. 5 is a diagram illustrating a match list.

DESCRIPTION OF EMBODIMENTS

Figure 6:
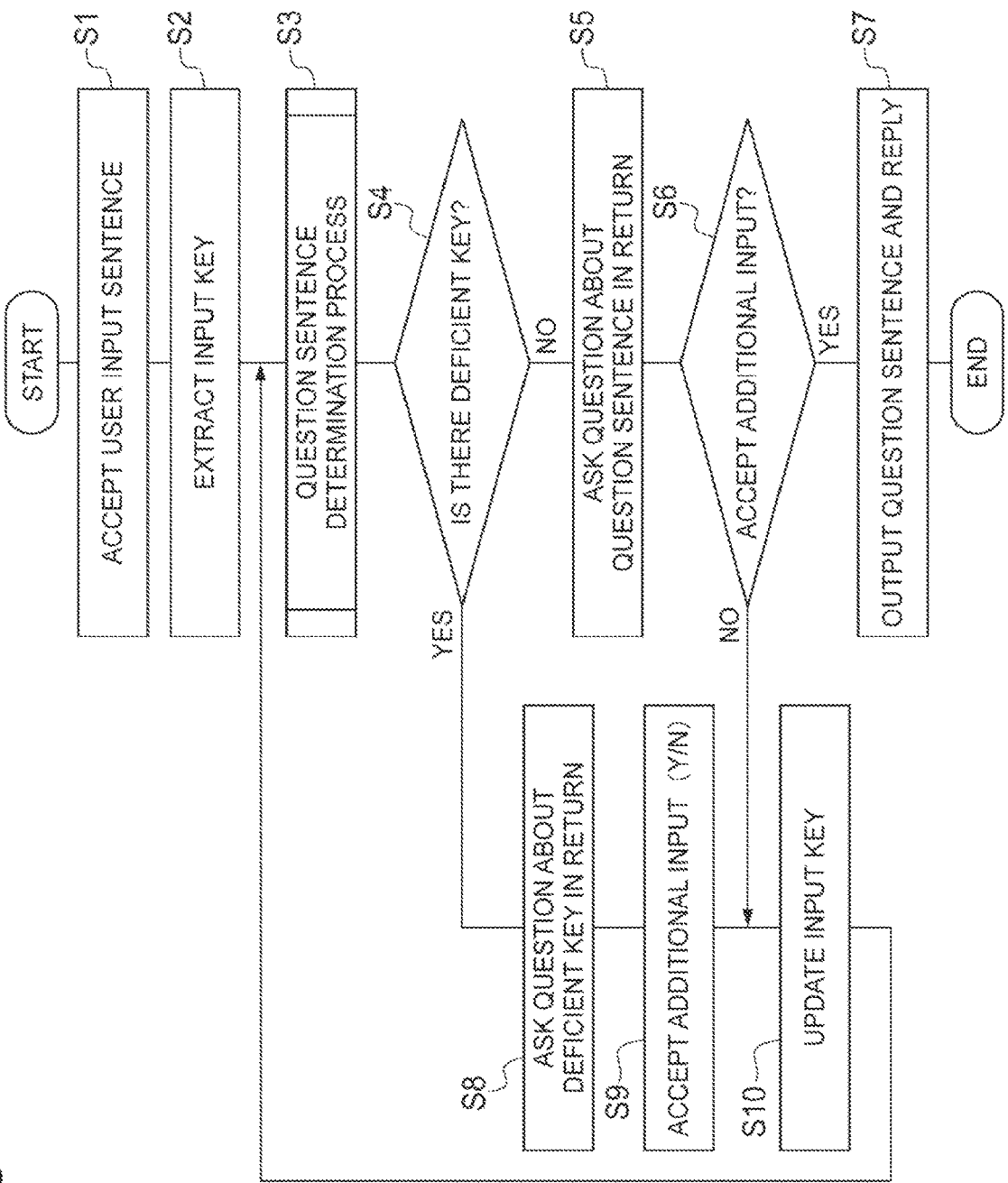
FIG. 6 is a flow diagram illustrating operations of the dialogue system.

Hereinafter, an embodiment of the present disclosure will be described in detail with reference to the accompanying drawings. For convenience, components which are substantially the same are denoted by the same reference numerals and signs, and may not be described. Meanwhile, in the present embodiment, inputs in Japanese are assumed unless otherwise stated.

FIG. 1 is a block diagram illustrating a configuration of a dialogue system according to an embodiment of the present disclosure. A dialogue system 1 is a system that performs a response (return question) for prompting a user to make an additional input with respect to the user's input of a character string and specifies the user's intention. The dialogue system 1 according to the present embodiment is a system that specifies optimum frequently asked questions (FAQ), and outputs a return question sentence for specifying a question sentence requested by a user to a terminal with respect to the user's input of a character string. A question sentence is specified by an additional input for the return question sentence being input from the user. For example, in a case where the sentence "購入する方法きかん" (this means 'how to purchase, Kikan') is input in Japanese by a user, a return question sentence for specifying a question sentence corresponding to this input is output. Meanwhile, this sentence indicates an inquiry of "購入する方法" (this means 'how to purchase'), but indicates an unclear character string of what "きかん" (read as 'Kikan') means. A return question sentence may be, for example, a sentence for questioning a user as to a keyword such as "Is your question about ∘∘?" or a sentence for confirming a question sentence to a user such as "Is your question ∘∘?" A user's additional input for a return question sentence may be, for example "YES," "NO," or the like. In a case where a question sentence is specified by an additional input, the dialogue system 1 outputs the specified question sentence and a reply of the question sentence.

The dialogue system 1 includes a terminal device 10, a dialogue device 20, and an FAQ database 30. The dialogue device 20 can transmit and receive data to and from the terminal device 10 and the FAQ database 30 through a moving object communication network or a communication network such as the Internet. The terminal device 10 is an information processing terminal such as, for example, a smartphone, a cellular phone, a tablet terminal, a personal digital assistant (PDA), or a personal computer. The terminal device 10 is constituted by hardware such as a central processing unit (CPU), a memory, and a communication module. The terminal device 10 transmits and receives information to and from the dialogue device 20 through a communication network. The terminal device 10 includes a user input unit 11 and a display unit 12. The user input unit 11 accepts an input of an input sentence from a user. In addition, the user input unit 11 accepts an input of an additional input from a user with respect to a return question from the terminal device 10. The input sentence, the additional input, or the like accepted by the user input unit 11 is output to the dialogue device 20. The user input unit 11 is, for example, a touch panel display, and acquires an input sentence, an additional input, or the like on the basis of a user's operation. Meanwhile, the user input unit 11 may be constituted by a button, a keyboard, a microphone, or the like.

The display unit 12 displays the input sentence, the additional input, or the like accepted by the user input unit 11. In addition, the display unit 12 displays information of a return question sentence or the like which is input from the dialogue device 20. In a case where the user input unit 11 is constituted by a touch panel display, the display unit 12 can be constituted by the same touch panel display as that of the user input unit 11.

The FAQ database 30 is an information processing terminal such as a server computer as an example, and is constituted by hardware such as a CPU, a memory, and a communication module. FIG. 2 is an example of data stored in an FAQ database. As shown in FIG. 2, the FAQ database (storage unit) 30 stores a question sentence (resulting sentence candidate), a storage key group containing one or a plurality of stored keywords associated with the question sentence, and a reply of the question sentence. A stored keyword constituting the storage key group is a word extracted from a question sentence through a morphological analysis. For example, in a case where a question sentence which is input in Japanese is "購入する方法" (how to purchase), the storage key group has "購入" (this means 'purchase') and "方法" (this means 'how to') as stored keywords. The reply is information managed by a system operator who manages the FAQ database 30, and is registered by, for example, the system operator. Meanwhile, when question sentences are stored in the FAQ database 30, an ID is added to each question sentence by numerals or the like.

In addition, the FAQ database 30 stores a fluctuation dictionary. FIG. 3 is a diagram illustrating a fluctuation dictionary. As shown in FIG. 3, the fluctuation dictionary stores a stored keyword and a fluctuation notation for the stored keyword in association with each other. The fluctuation notation is a character string which is in a close distance from a stored keyword. The distance may be an index indicating how similar two character strings are to each other. For example, the distance may be defined so that the distance becomes smaller as the degree of similarity increases using the degree of similarity of sounds, the degree of similarity of meanings, and the degree of similarity caused by an input method. In the present embodiment, as examples of the fluctuation notation, a reading, a synonym, and an erroneous input pattern are shown. The reading is a character string in which a stored keyword is notated in kana in Japanese. The synonym may be a relationship between Japanese and a loanword such as "起動" (this means 'activate') and "ブート" (this means 'boot') of a computer term which are shown, or between Japanese words. The erroneous input pattern is a character string that has a tendency to be erroneously input by a user. In the shown example, "まい1" which is a result of typing "mail" on a Japanese keyboard with Roman input is shown as an erroneous input pattern of "メール" (this means 'mail'). Meanwhile, the fluctuation notation may contain a foreign language notation of a loanword such as "mail" for "メール."

The dialogue device 20 is an information processing terminal such as a server computer as an example, and is constituted by hardware such as a CPU, a memory, and a communication module. As shown in FIG. 1, the dialogue device 20 includes an input unit 21, a keyword acquisition unit 22, a category generation unit 23, a ranking determination unit 24, and a presentation unit 26. The input unit 21 is a portion that accepts an input sentence, an additional input, or the like which is input from the terminal device 10 by a user through a communication network.

The keyword acquisition unit 22 acquires an input key group containing one or a plurality of input keywords on the basis of the input sentence accepted by the input unit 21. The acquired input key group is held in association with the input sentence. For example, the keyword acquisition unit 22 extracts words from the input sentence using a technique such as a morphological analysis, and acquires the words as input keywords in a case where the extracted words are stored in the FAQ database as stored keywords. For example, in a case where a Japanese input sentence is "購入する方法きかん" (how to purchase, Kikan), "購入" (purchase) and "方法" (how to) are acquired as input keywords.

In addition, in a case where there is a stored keyword which is in a predetermined correspondence relation with an input character string, the keyword acquisition unit 22 acquires an input keyword obtained by adding additional information to the stored keyword. In the present embodiment, when a character string stored as the fluctuation notation of a stored keyword is contained in the input character string, a stored keyword corresponding to the fluctuation notation is acquired as an input keyword. A fluctuation flag (additional information) indicating the fluctuation notation of a stored keyword is added to this input keyword. For example, in a case where a Japanese input sentence is "購入する方法きかん" (how to purchase, Kikan), "きかん" (read as 'Kikan') is stored as a fluctuation notation, and "'既刊" (this means 'already issued book') which is read the same way, as "きかん" (read as 'Kikan') is acquired as an input keyword. Meanwhile, in the shown example, "期間" (period) of which the reading is "きかん" (read as 'Kikan') is also stored in the FAQ database 30 as a stored keyword. In this manner, in a case where the same fluctuation notation is stored in association with different stored keywords, one of different stored keywords can be acquired as an input keyword. For example, stored keywords may be selected so that the number of question sentences containing acquired input keywords becomes largest.

Meanwhile, in the present embodiment, in a case where a word extracted from an input sentence is coincident with a stored keyword, the keyword acquisition unit 22 preferentially acquires a coincident stored keyword even if there is a fluctuation notation which is coincident with the word. In addition, in a case where there is no stored keyword which is coincident with the extracted word, the keyword acquisition unit 22 may search for a fluctuation notation using the reading of the extracted word. For example, when "機動" (read as 'mobile') is extracted from an input sentence in a case where "機動" (mobile) is not contained in stored keywords, "起動" (this means 'activate') can be acquired using "きどう" (read as 'Kidou') which is a reading of "機動" (mobile) as a search word. In the following description, an input keyword to which a fluctuation flag is added may be referred to as a fluctuation keyword.

In addition, the keyword acquisition unit 22 can update the input key group on the basis of a user's additional input for a return question sentence for specifying an input sentence. That is, in a case where the user's additional input for a return question for questioning about a keyword is acquired by the input unit 21, an input keyword can be added on the basis of the additional input. For example, in a case where an affirmative reply to a return question sentence of "Is your question about "一括"?" is acquired, the input key group is updated so that "一括" is added as an input keyword. Meanwhile, the return question sentence is presented to the terminal device 10 by the presentation unit 26 to be described later.

In addition, when a reply that indicates negation is input by a user in a case where a fluctuation keyword is contained in a return question sentence, the keyword acquisition unit 22 deletes the fluctuation keyword from the input key group. For example, in a case where "既刊" (already issued) out of "既刊," "購入" and "方法" (method) constituting Japanese input keywords is a fluctuation keyword, and a case where a negative reply to a return question sentence of "Is your question "既刊を購入する方法" (how to purchase the already issued book)?" is acquired, the keyword acquisition unit 22 deletes "既刊" (already issued book) from the input key group. In this case, as shown in FIG. 3, when "期間" (period) having "きかん" (read as 'Kikan') which is the same fluctuation notation is stored in the fluctuation dictionary, "期間" (period) is newly acquired as a fluctuation keyword by the keyword acquisition unit 22.

The category generation unit 23 classifies question sentences stored in the FAQ database 30 into a plurality of categories. In the present embodiment, the category generation unit 23 acquires a question sentence corresponding to a storage key group containing at least one input keyword from the FAQ database 30. The category generation unit 23 classifies the acquired question sentences on the basis of a comparison between the input key group acquired by the keyword acquisition unit 22 and the storage key group contained in the FAQ database 30.

In a method of comparison between the input key group and the storage key group in the category generation unit 23, a match key, a deficient key and an excess key are defined. The match key can be defined as a stored keyword of the storage key group which is coincident with an input keyword of the input key group. For example, in a case where the input key group has input keywords of "既刊" (already issued book), "購入" (purchase) and "方法" (how to), and the storage key group has stored keywords of "購入" (purchase), "新刊" (this means 'new book') and "方法" (how to), a question sentence corresponding to the storage key group has "購入" (purchase) and "方法" (how to) as match keys.

The deficient key can be defined as a stored keyword of the storage key group in which the input key group is deficient. For example, in a case where the input key group has input keywords of "既刊" (already issued book), "購入" (purchase) and "方法" (how to), and the storage key group has stored keywords of "購入" (purchase), "新刊" (new book) and "方法" (how to), a question sentence corresponding to the storage key group has "新刊" (new book) as a deficient key.

The excess key is an input keyword of the input key group acquired in excess with respect to the storage key group, and can be defined as an input keyword which is not a fluctuation keyword. For example, the input key group has input keywords of "既刊" (already issued book), "購入" (purchase) and "方法" (how to), and "既刊" (already issued book) is assumed to be a fluctuation keyword. In this case, when the storage key group has a stored keyword of "購入" (purchase), a question sentence corresponding to the storage key group has only "方法" (how to) as an excess key. "既刊" (already issued book) does not become an excess key.

The category generation unit 23 classifies question sentences into a plurality of categories on the basis of the presence or absence of a deficient key and the presence or absence of an excess key. The categories defined by the category generation unit 23 include a perfect match, a deficient match, an excess match and an excess and deficient match.

The perfect match is defined as a state in which the input key group and the storage key group are perfectly coincident with each other. That is, the category generation unit 23 classifies a question sentence, corresponding to a storage key group in which there are no the deficient key and no excess key, as a perfect match.

The deficient match is defined as a state in which the storage key group is deficient in input keywords. That is, the category generation unit 23 classifies a question sentence, corresponding to a storage key group in which there is the deficient key and there is no excess key, as a deficient match.

The excess match is defined as a state in which input keywords are acquired in excess with respect to the storage key group. That is, the category generation unit 23 classifies a question sentence, corresponding to a storage key group in which there is no deficient key and there is the excess key, as an excess match.

The excess and deficient match is defined as a state in which the storage key group is deficient in input keywords and input keywords are acquired in excess with respect to the storage key group. That is, the category generation unit 23 classifies a question sentence, corresponding to a storage key group in which there are the deficient key and the excess key, as an excess and deficient match.

FIG. 4 is a diagram illustrating a relationship between an input key group and a storage key group, and input keywords constituting the input key group and stored keywords constituting the storage key group are represented by letters for the sake of convenience. In the example of FIG. 4, an input key group consisting of input keywords of A, B, and C is acquired on the basis of an input sentence. C of the input keywords is a fluctuation keyword. In addition, question sentences acquired from the FAQ database 30 have IDs of 1 to 9, and have one or a plurality of stored keywords of A to K.

The input keywords are A, B, and C, and thus A, B, and C of the stored keywords contained in the storage key group are counted as match keys. The number of matches which is information according to the number of match keys (match number information) is obtained by counting the match keys. In the present embodiment, in a case where A and B to which a fluctuation flag is not added are counted as match keys, the number of matches of one stored keyword is counted as 1. In addition, in a case where a fluctuation keyword is counted as a match key, the number of matches of one fluctuation keyword is counted as 0.5 which is a numerical value smaller than 1. In this manner, in a case where a fluctuation keyword is counted as a match key, the influence of one input keyword on the number of matches is reduced. In addition, D to K of stored keywords contained in the storage key group are counted as deficient keys. In addition, in each ID, A and B which are not fluctuation keywords out of the keywords A to C that are not present in the storage key group are counted as excess keys.

For example, in the question sentence of ID9, the number of matches is 1.5 since A and C are contained in the storage key group, the number of deficiencies is 2 since F and E are contained in the storage key group, and the number of excesses is 1 since B is not contained in the storage key group. In addition, in the question sentence of ID2, the number of matches is 2 since A and B are contained in the storage key group, and the number of deficiencies is 0 since no deficient key is contained in the storage key group. In this ID2, although C is not contained in the storage key group, C is a fluctuation keyword, and thus the number of excesses is 0.

FIG. 5 is a diagram illustrating a match list. In FIG. 5, a match list of the question sentences in the example of FIG. 4 is shown. ID3 and ID2 in which both the numbers of deficiencies and the numbers of excesses are zero are classified as perfect matches. ID7, ID4 and ID6 in which the numbers of excesses are zero and the numbers of deficiencies are not zero are classified as deficient matches. ID8 and ID1 in which the numbers of deficiencies are zero and the numbers of excesses are not zero are classified as excess matches. ID9 and ID6 in which neither the numbers of deficiencies nor the numbers of excesses are zero are classified as excess and deficient matches.

As described above, the keyword acquisition unit 22 updates the input key group on the basis of a user's additional input for a return question sentence for specifying an input sentence. In this case, a fluctuation may occur in a result of comparison between the input key group and the storage key group. Consequently, in a case where the input key group is updated by the keyword acquisition unit 22, the category generation unit 23 classifies the question sentences again.

The ranking determination unit 24 determines the priority ranking of question sentences on the basis of the degree of coincidence between the input key group and the storage key group. The degree of coincidence is an index indicating how much the storage key group is coincident with the input key group. In the present embodiment, the degree of coincidence is determined so as to increase in the order of a perfect match>a deficient match>an excess match>an excess and deficient match. That is, the ranking determination unit 24 determines the priority ranking in order from question sentences classified as a perfect match.

Further, the ranking determination unit 24 determines the priority ranking of question sentences within each category on the basis of the degree of coincidence between the input key group and the storage key group. In the determination of the priority ranking within a category, the ranking determination unit 24 determines the degree of coincidence of each question sentence so that the degree of coincidence increases as the number of matches of the question sentences becomes larger. Meanwhile, since the number of matches in a case where a fluctuation keyword is counted as a match key is reduced, the influence of the fluctuation keyword on the degree of coincidence is reduced more than an input keyword to which a fluctuation flag is not added. The ranking determination unit 24 determines the priority ranking in descending order of the degree of coincidence. In addition, when the priority ranking of question sentences classified as the same category conflicts as in a case where the numbers of matches of the question sentences are the same as each other, the ranking determination unit 24 may determine the degree of coincidence of each question sentence so that the degree of coincidence increases as the number of deficiencies or the number of excesses becomes smaller. As described above, the keyword acquisition unit 22 updates the input key group on the basis of a user's reply to a return question for specifying an input sentence. In this case, a fluctuation may occur in a result of comparison between the input key group and the storage key group. Consequently, in a case where the input key group is updated by the keyword acquisition unit 22, the ranking determination unit 24 updates the priority ranking of question sentences.

The presentation unit 26 selects a question sentence of highest priority ranking determined by the ranking determination unit 24. The presentation unit 26 outputs a return question sentence to the terminal device 10 on the basis of the selected question sentence. For example, in a case where the question sentence of highest priority is classified as a perfect match or an excess match, the presentation unit 26 outputs a return question sentence for confirming the question sentence to the terminal device 10. As an example, the presentation unit 26 acquires the whole question sentence. The presentation unit 26 generates a return question sentence in which the whole question sentence is quoted using quotation marks, and outputs this generated return question sentence to the terminal device 10. In addition, in a case where the question sentence of highest priority is classified as a deficient match or an excess and deficient match, the presentation unit 26 outputs a return question sentence for questioning about a deficient key contained in the question sentence to the terminal device 10. As an example, the presentation unit 26 acquires the deficient key contained in the question sentence. The presentation unit 26 generates a return question sentence in which the deficient key is quoted using quotation marks, and outputs this generated return question sentence to the terminal device 10. Meanwhile, in a case where the question sentence has a plurality of deficient keys, one deficient key is selected from among the plurality of deficient keys and a return question sentence is generated.

Subsequently, operations of the dialogue system 1 will be described. FIG. 6 is a flow chart illustrating operations of the dialogue system. In the dialogue system 1, a user's input sentence is first accepted. That is, the user inputs an input sentence through the user input unit 11 of the terminal device 10. Thereby, the input unit 21 of the dialogue device 20 acquires the input sentence (step S1).

Subsequently, the keyword acquisition unit 22 acquires an input key corresponding to the input sentence on the basis of the input sentence (step S2). For example, in step S1, it is assumed that an input sentence that contains A, B, and C as input keywords is input. In this case, the keyword acquisition unit 22 acquires an input key group that contains A, B, and C as input keywords.

Figure 7:
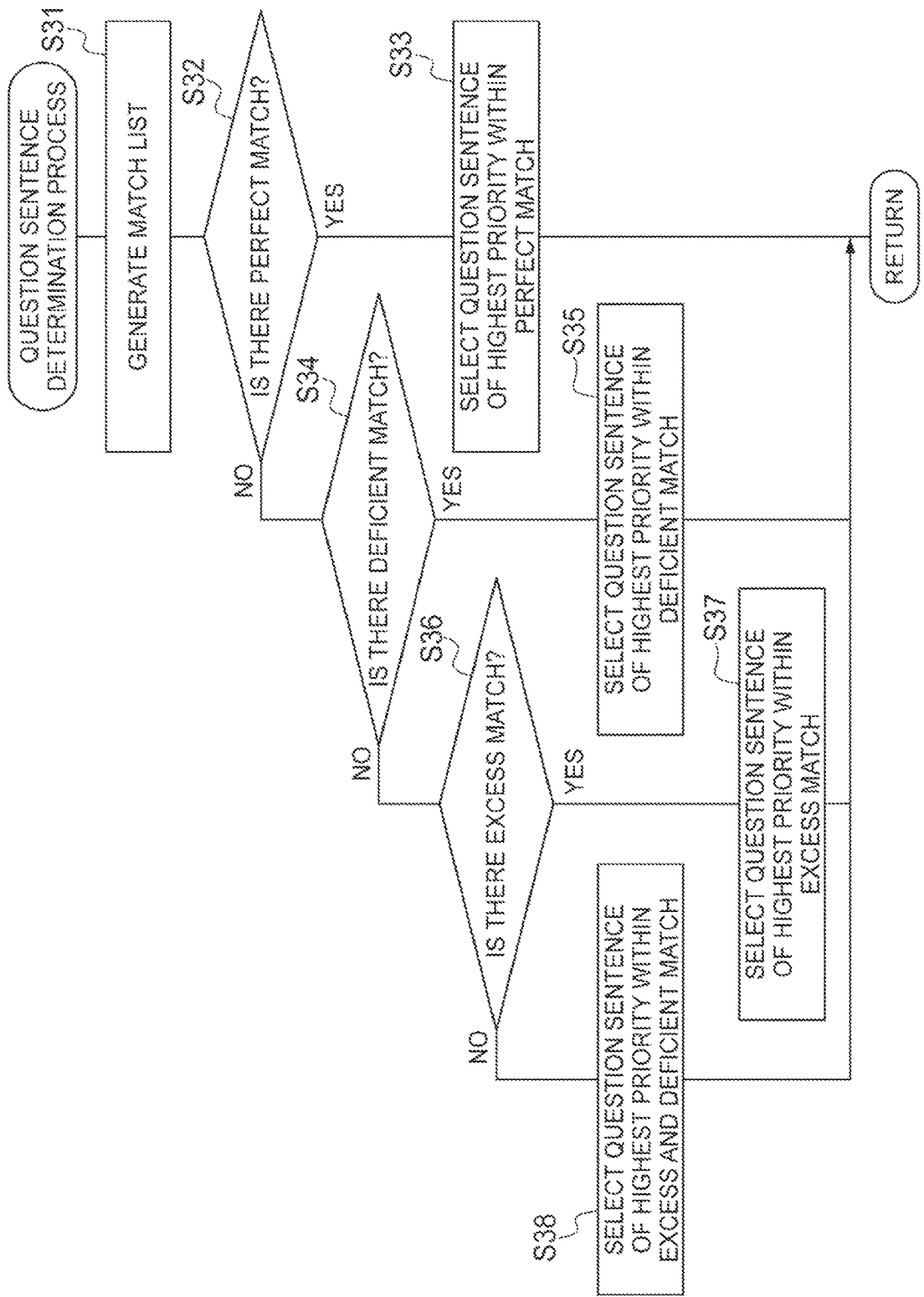
FIG. 7 is a flow diagram illustrating operations of the dialogue system.

In the following step S3, a question sentence determination process is executed. As shown in FIG. 7, a match list corresponding to the input sentence is first generated by the category generation unit 23 (step S31). In step S31, a question sentence that contains at least one input keyword as a stored keyword is first acquired from among the question sentences stored in the FAQ database 30 by the category generation unit 23. The stored keywords of the acquired question sentence are divided into a match key, a deficient key, and an excess key, and the numbers of match keys, deficient keys and excess keys are derived for each question sentence. The category generation unit 23 classifies each question sentence as any of the perfect match, the deficient match, the excess match and the excess and deficient match on the basis of the presence or absence of the deficient key and the presence or absence of the excess key. In a case where a plurality of question sentences are classified into each category, priority ranking within the category is determined by the ranking determination unit 24.

In the present embodiment, the priority ranking between match lists is determined in the order of the perfect match, the deficient match, the excess match, and the excess and deficient match by the ranking determination unit 24. Consequently, in the following step S32, it is determined whether there is a perfect match within the match list. In a case where there is a perfect match within the match list, a question sentence of highest priority within the perfect match is selected by the ranking determination unit 24 (step S33). In the examples of FIGS. 4 and 5, the question sentence of ID3 having the largest number of matches is selected from among the question sentences classified as the perfect match.

In a case where it is determined in step S32 that there is no perfect match, it is determined whether there is a deficient match within the match list (step S34). In a case where there is a deficient match within the match list, a question sentence of highest priority within the deficient match is selected by the ranking determination unit 24 (step S35). In the examples of FIGS. 4 and 5, the question sentence of ID7 having the largest number of matches is selected from among the question sentences classified as the deficient match.

In a case where it is determined in step S34 that there is no deficient match, it is determined whether there is an excess match within the match list (step S36). In a case where there is an excess match within the match list, a question sentence of highest priority within the excess match is selected by the ranking determination unit 24 (step S37). In the examples of FIGS. 4 and 5, the question sentence of ID8 having the largest number of matches is selected from among the question sentences classified as the excess match.

In a case where it is determined in step S36 that there is no excess match, a question sentence of highest priority within the excess and deficient match is selected by the ranking determination unit 24 (step S38). In the examples of FIGS. 4 and 5, the question sentence of ID9 having the largest number of matches is selected from among the question sentences classified as the excess and deficient match.

When the question sentence determination process in step S3 is finished, the process proceeds to step S4. In step S4, it is determined whether there is a deficient key in the selected question sentence. In a case where it is determined that there is no deficient key, the selected question sentence is any of the perfect match and the excess match. Consequently, in the following step S5, a return question sentence for specifying the selected question sentence is output to the terminal device 10. For example, in a case where the content of the question sentence is "既刊を購入する方法" (how to purchase an already issued book), a return question sentence of "Is your question "既刊を購入する方法" (how to purchase an already issued book)?" is output.

In the terminal device 10, an additional input for a return question sentence for specifying a question sentence is accepted (step S6). In a case where the additional input for a return question sentence is "YES," the presentation unit 26 outputs a reply corresponding to the question sentence together with the question sentence to the terminal device 10 (step S7).

On the other hand, in a case where an additional input in step S6 is "NO," the process of the dialogue system 1 proceeds to step S10. Step S10 will be described later.

In step S4, in a case where it is determined that there is a deficient key, the process proceeds to step S8. In step S8, a return question sentence for questioning about the deficient key is generated by the presentation unit 26, and this return question sentence is output to the terminal device 10. For example, in a case where a question sentence of "既刊を一括で購入する方法" (how to purchase already issued book in bulk) is selected with respect to an input sentence of "購入する方法きかん" (how to purchase, Kikan), a return question sentence of "Is your question about "一括" (this means 'bulk')?" is output.

In the terminal device 10, the acceptance of a user's additional input is executed together with display of the return question sentence (step S9). When the additional input for the return question sentence is input to the terminal device 10 by the user, the additional input is output from the terminal device 10 to the dialogue device 20. Subsequently, the process of the dialogue system 1 proceeds to step S10. In step S10, the additional input from the user is accepted, and input keys are updated. That is, in a case where the user inputs an additional input for affirming the return question sentence in step S8, the keyword acquisition unit 22 acquires the deficient key contained in the return question sentence as an input keyword, and updates the input key group. For example, in a case where an additional input of "YES" is performed in response to a return question sentence of "Is your question about "一括" (bulk)?," "一括" (bulk) is newly acquired as an input keyword. Meanwhile, in a case where the user inputs an additional input for negating the return question sentence in step S8, the match list may not be updated.

In addition, in a case where the user inputs an additional input for negating the return question sentence in step S6, the keyword acquisition unit 22 deletes a fluctuation keyword contained in the return question sentence, and updates the input key group. For example, in a case where an additional input of "NO" is performed in response to a return question sentence of "Is your question "既刊を購入する方法" (how to purchase an already issued book)?," "既刊" (already issued book) is deleted from the input key group.

Subsequently, going back to step S3, the question sentence determination process is executed on the basis of the updated input key group, and step S3 and the subsequent operations are repeated. Meanwhile, operations from the input of an input sentence to the specification of a final question sentence may be controlled so that a return question for confirming a question sentence having the same ID is not performed multiple times. For example, in a case where a question sentence once confirmed as "Is your question "○○"?" to the user is ranked as the highest priority again, a question sentence of the next priority ranking of the question sentence may be selected by the presentation unit 26.

Figure 8:
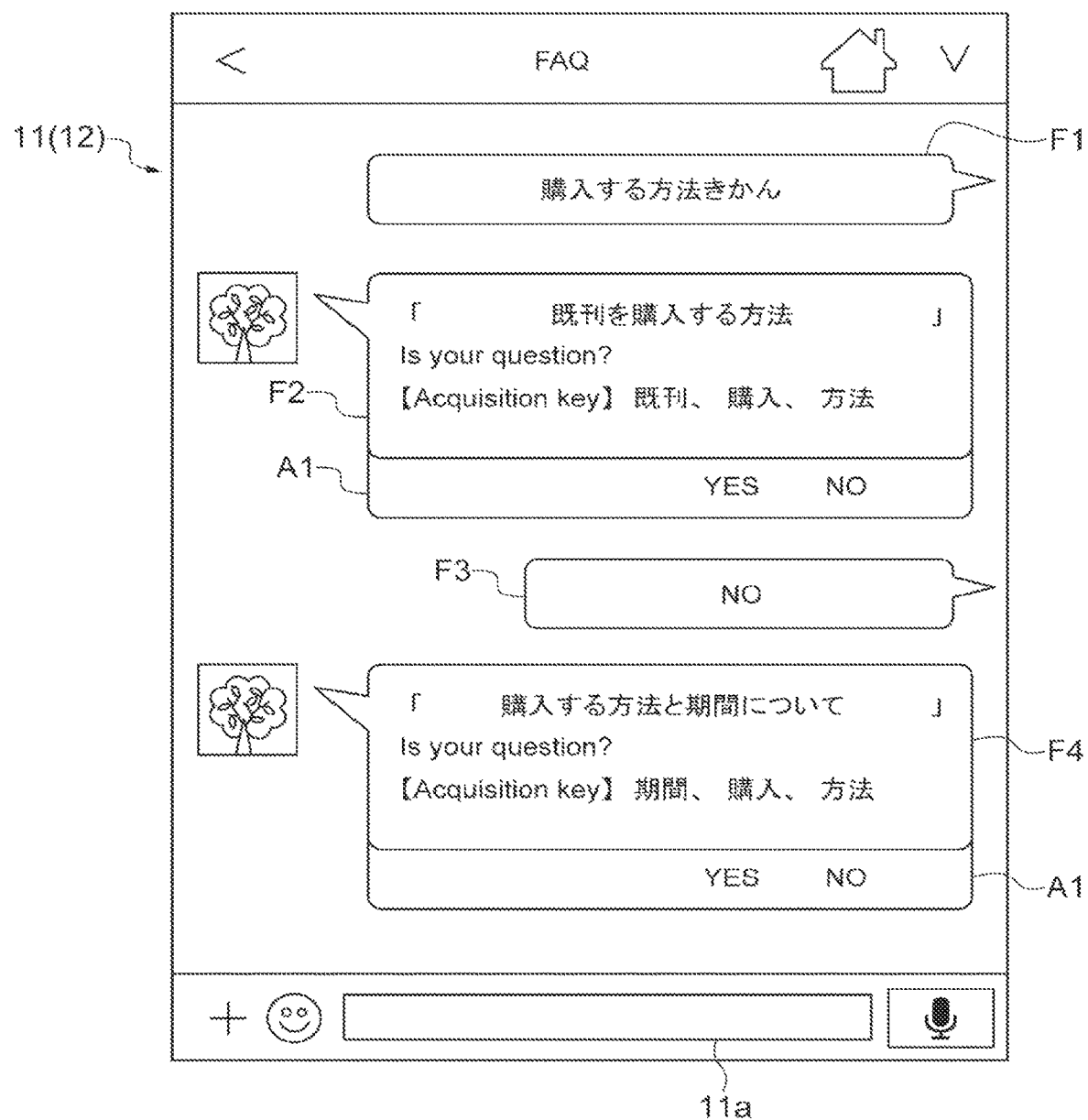
FIG. 8 is a diagram illustrating an example of a screen which is displayed on a terminal device.

FIG. 8 is a diagram illustrating a display screen of the terminal device 10, and shows the progress of a dialogue between the terminal device 10 (a user) and the dialogue device 20. Here, the terminal device 10 including a touch panel display will be described. Therefore, the display unit 12 functions as the user input unit 11, and a user can input and select information by tapping an icon or the like which is displayed on the display unit 12. An input window 11a of the display unit 12 is a portion that accepts a character input through a touch panel. Balloons F1 to F4 are portions indicating dialogues between a user and the dialogue system 1. An icon A1 is a portion that accepts an additional input.

The balloon F1 indicates an input sentence which is input to the terminal device 10 by a user. The balloon F3 indicates an additional input which is input to the terminal device 10 by the user. The balloons F2 and F4 indicate return question sentences generated in the dialogue device 20 with respect to the input sentence which is input by the user. In the shown example, the balloons of the dialogue system including the FAQ database and the fluctuation dictionary shown in FIGS. 2 and 3 are exemplified.

For example, in the terminal device 10, when the input sentence shown in the balloon F1 is input, the return question sentence transmitted from the dialogue device 20 is output as shown in balloon F2. In the shown example, input keywords acquired by the keyword acquisition unit 22 are displayed as an acquisition key together with the return question sentence. In this example, "既刊" (already issued book) is acquired as a fluctuation keyword from the user's input sentence. In addition, in the balloon F2, the icon A1 (YES, NO) indicating an additional input that can be selected by the user is shown together with the return question sentence. The user can input any of "YES" and "NO" by tapping the icon A1. In the balloon F2, since a return question for confirming the question sentence is performed, a reply to the question sentence is displayed on the screen when the user taps "YES."

In the example of FIG. 8, as shown in the balloon F3, "NO" is input by the user. In this case, the display unit 12 displays the balloon F4. In this example, "既刊" which is a fluctuation keyword is deleted by the user replying "NO" with respect to the return question of the balloon F2. As shown in the fluctuation dictionary of FIG. 2, "期間" (period) associated with "きかん" (read as 'Kikan') having the same reading is acquired as a new fluctuation keyword.

Next, processing when question sentences are input in English will be described with reference to FIG. 9. A balloon F11 indicates an input sentence which is input by the user. A balloon F13 indicates an additional input which is input to the terminal device 10 by the user. Balloons F12 and F14 indicate return question sentences generated in the dialogue device 20 with respect to the input sentence which is input by the user. In the shown example, the balloons of the dialogue system including an FAQ database and a fluctuation dictionary for English input are exemplified.

For example, in the terminal device 10, when the input sentence shown in the balloon F11 is input, the return question sentence transmitted from the dialogue device 20 is output as shown in the balloon F12. In the shown example, input keywords acquired by the keyword acquisition unit 22 are displayed as an acquisition key together with the return question sentence. In this example, "patent," "write," and "how to" are acquired as fluctuation keywords from the user's input sentence. In addition, in the balloon F2, an icon A1 (YES/NO) indicating an additional input that can be selected by the user is shown together with the return question sentence. The user can input any of "YES" and "NO" by tapping the icon A1. In the balloon F2, since a return question for confirming the question sentence is performed, a reply to the question sentence is displayed on the screen when the user taps "YES."

Figure 9:
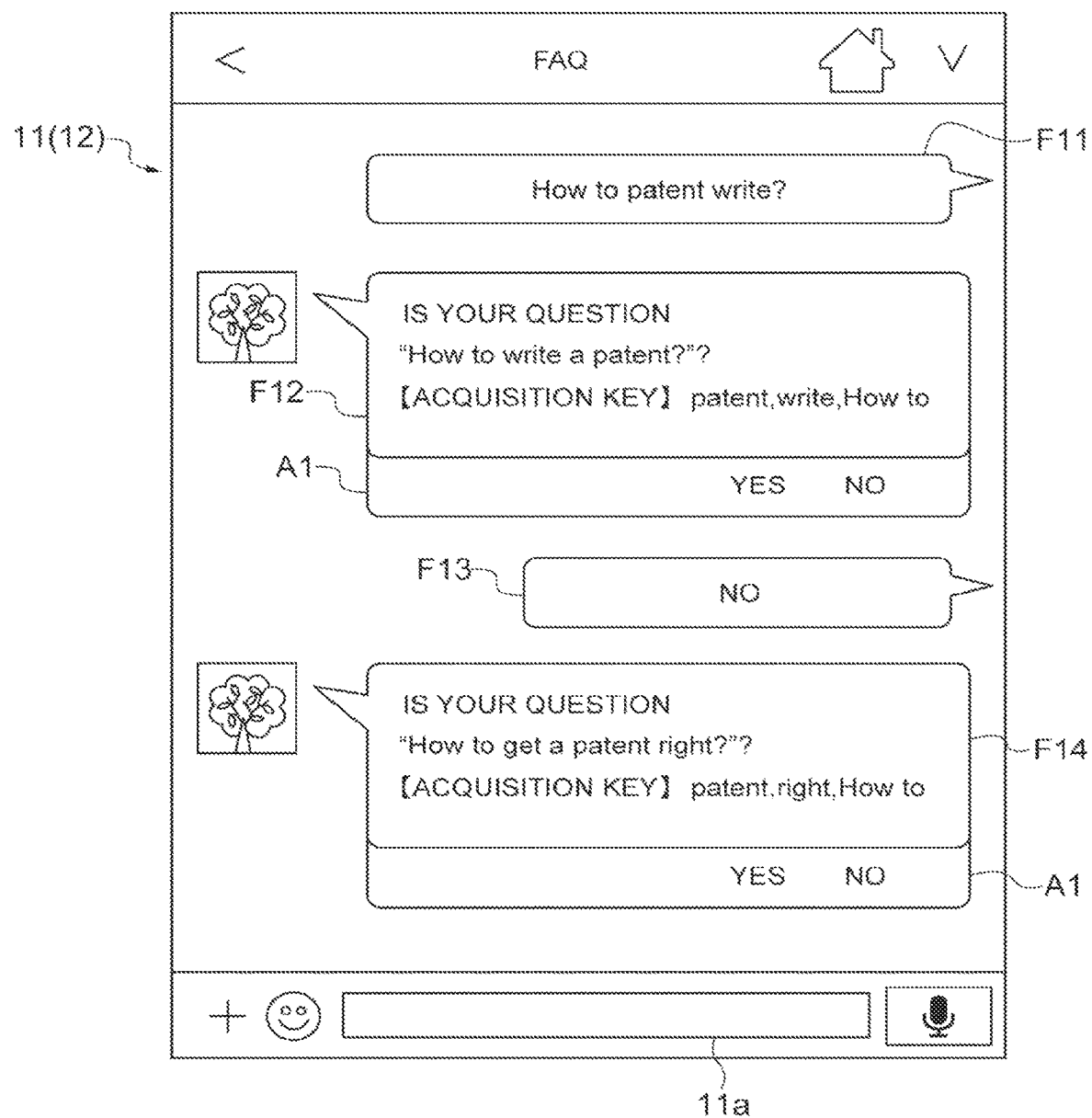
FIG. 9 is a diagram illustrating an example of a screen in English notation which is displayed on the terminal device.

In the example of FIG. 9, as shown in the balloon F13, "NO" is input by the user. In this case, the display unit 12 displays the balloon F14. In this example, "write" which is a fluctuation keyword is deleted by the user replying "NO" with respect to the return question of the balloon F12. Right having the same reading which is associated with "write" is acquired as a new fluctuation keyword in accordance with the fluctuation dictionary.

Meanwhile, in the example of FIG. 9, the FAQ database 30 stores "write" and "right" in association with each other as the fluctuation dictionary. Besides, a character string intended for an erroneous input, for example, a character string intended for an erroneous input such as "righte" may be associated, or other hetero-homonyms may be associated. In addition, synonyms may also be naturally associated.

As described above, in the dialogue system 1 according to an embodiment, the storage key group associated with question sentences is stored in the FAQ database 30. In this system, when a character string is input by a user, the input key group is acquired by the keyword acquisition unit 22. In addition, the ranking determination unit 24 determines the priority ranking of question sentences on the basis of the degree of coincidence between the input key group and the storage key group. As described above, the dialogue system 1 of an aspect can acquire an input keyword obtained by adding a fluctuation flag to a stored keyword which is in a predetermined correspondence relation with a character string. That is, when there is a stored keyword corresponding to a predetermined correspondence relation with an input character string even if the user's erroneous input or the like is present, the stored keyword is acquired as an input keyword (a fluctuation keyword). When the priority ranking of question sentences is determined in the ranking determination unit 24, the influence of a fluctuation input keyword on the degree of coincidence is reduced. Therefore, even in a case where the acquisition of the fluctuation keyword is not in line with the user's intention, a question sentence which is in line with the original intention is not buried. On the other hand, in a case where the acquisition of the fluctuation keyword is in line with the user's intention, the fluctuation keyword is reflected in the degree of coincidence, so that there is a tendency to reach question sentences which are in line with the user's intention. In this manner, it is possible to cope efficiently with an erroneous input or the like. In addition, the amount of dialogue in the dialogue system 1 is reduced, and thus it is possible to reduce the amount of data communication as a result. Therefore, it is possible to reduce the processing load of a server 100, and to improve processing efficiency for the dialogue.

In addition, the degree of coincidence is determined on the basis of information including the number of matches. In a case where a fluctuation keyword is counted as a match key, the ranking determination unit 24 reduces the influence of one input keyword on the number of matches more than in a case where an input keyword to which a fluctuation flag is not added is counted as a match key. The number of matches is the number of keywords which are coincident with each other between the input key group and the storage key group. Therefore, the number of matches directly indicates the degree of coincidence between the input key group and the storage key group. It is possible to reliably reduce the influence of a fluctuation keyword on the degree of coincidence by reducing the influence of the fluctuation keyword on the number of matches.

The ranking determination unit 24 determines the degree of coincidence on the basis of information including the number of excess keys when a fluctuation keyword is excluded. Specifically, the ranking determination unit 24 determines the priority ranking of question sentences in the order of the perfect match, the deficient match, the excess match, and the excess and deficient match which are classified by the category generation unit 23. In a case where a question sentence contains an excess key, the question sentence is classified into the excess match or the excess and deficient match. However, in a case where an input keyword corresponding to an excess key is only a fluctuation keyword, the question sentence is classified as the perfect match or the deficient match having a high priority ranking Thereby, the priority ranking of question sentences in which only a fluctuation keyword becomes an excess key is prevented from lowering.

When a reply that indicates negation is input by a user in a case where a fluctuation keyword is contained in a return question sentence, the keyword acquisition unit 22 deletes the fluctuation keyword from the input key group. In a case where a question sentence is the perfect match or the excess match, a fluctuation keyword may be contained in a return question sentence. In a case where the perfect match or the excess match is selected as a question sentence, it is considered that usually a sufficient number of input keywords are arranged. In such a situation, in a case where it is determined that a question sentence is not in line with a user's intention, it is effective to review the input keywords in order to efficiently search for a question sentence. As compared with other input keywords, a fluctuation keyword is most likely not to be in line with a user's original intention. Consequently, there is a tendency to search for a question sentence which is in line with a user's original intention by deleting a fluctuation keyword.

Hereinbefore, the embodiment has been described in detail with reference to the accompanying drawings, but specific configurations are not limited to this embodiment.

For example, in a case where match keys are counted, an example in which the number of matches of keywords to which a fluctuation flag is not added is counted as 1, and the number of matches of fluctuation keywords is counted as 0.5, but there is no limitation thereto. In the present embodiment, in a case where the fluctuation keyword is counted as a match key, the influence of one input keyword on the number of matches should be reduced. For example, in a case where the number of matches of keywords to which a fluctuation flag is not added is counted as 1, the number of matches of fluctuation keywords may be counted as a value such as, for example, 0.75, 0.33, or 0.2 which is smaller than 1. In addition, the number of matches of fluctuation keywords may be counted as 1, and the number of matches of keywords to which a fluctuation flag is not added may be counted as a value such as 1.5 which is larger than 1.

Meanwhile, the block diagram used in the description of the above embodiment represents blocks in units of functions. These functional blocks (constituent elements) are realized by any combination of hardware and/or software. In addition, means for realizing each functional block is not particularly limited. That is, each functional block may be realized by one device which is physically and/or logically coupled, or may be realized by two or more devices which are physically and/or logically separated from each other by connecting the plurality of devices directly and/or indirectly (for example, wiredly and/or wirelessly).

Figure 10:
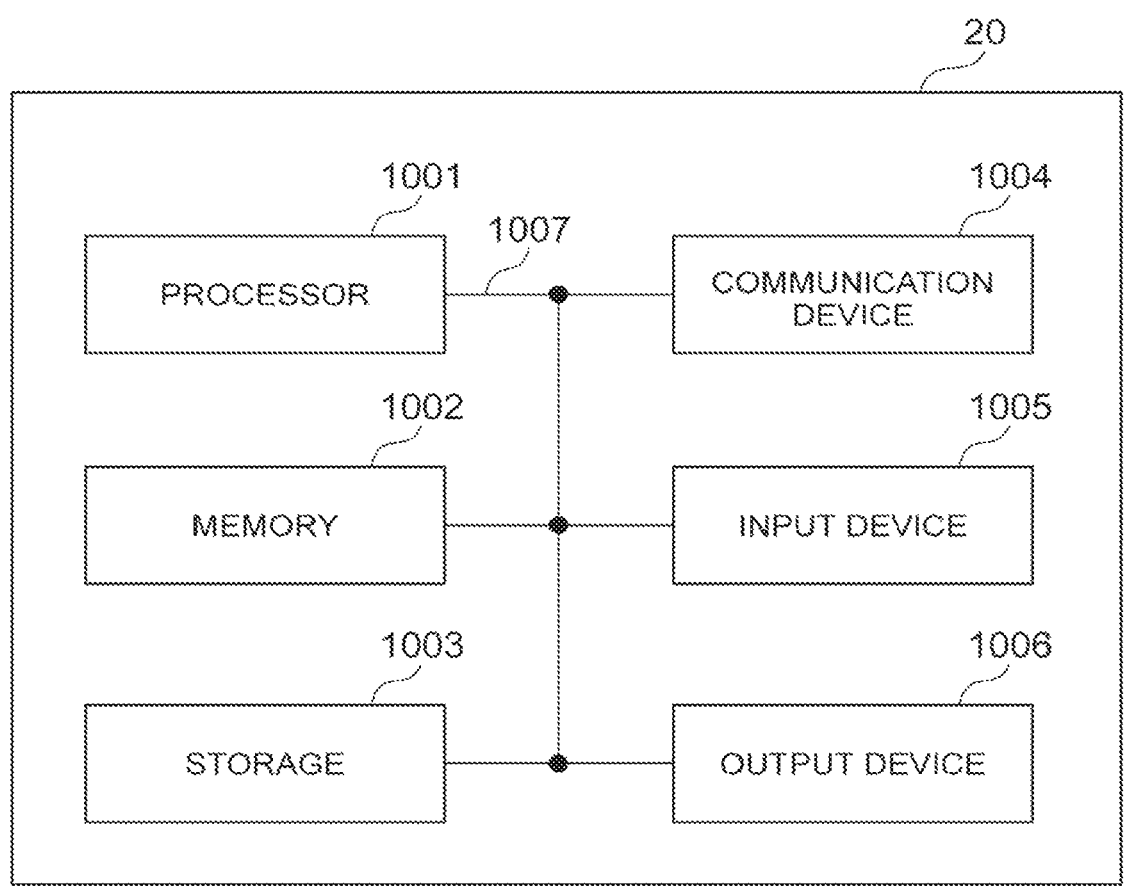
FIG. 10 is a diagram illustrating a hardware configuration of a dialogue device.

For example, the dialogue device 20 in an embodiment of the present disclosure may function as a computer that performs the process of the dialogue device 20 of the present embodiment. FIG. 10 is a diagram illustrating an example of a hardware configuration of the dialogue device 20 according to the present embodiment. The above-described dialogue device 20 may be physically configured as a computer device including a processor 1001, a memory 1002, a storage 1003, a communication device 1004, an input device 1005, an output device 1006, a bus 1007, and the like. In addition, the terminal device 10 and the FAQ database 30 may also have the same hardware configuration.

Meanwhile, in the following description, the wording "device" may be replaced by a circuit, a device, a unit, or the like. The hardware configuration of the dialogue device 20 may be configured to include one or a plurality of devices shown in the drawings, or may be configured without including some devices.

The processor 1001 performs an arithmetic operation by reading predetermined software (a program) on hardware such as the processor 1001 or the memory 1002, and thus each function in the dialogue device 20 is realized by controlling communication in the communication device 1004 and reading and/or writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, each function of the dialogue device 20 may be realized by the processor 1001.

In addition, the processor 1001 reads out a program (a program code), a software module and data from the storage 1003 and/or the communication device 1004 into the memory 1002, and executes various types of processes in accordance therewith. An example of the program which is used includes a program causing a computer to execute at least some of the operations described in the foregoing embodiment. For example, each function of the dialogue device 20 is stored in the memory 1002, and may be realized by a control program which is operated by the processor 1001. The execution of various types of processes described above by one processor 1001 has been described, but these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can be executed in order to carry out a method according to an embodiment of the present disclosure.

The storage 1003 is a computer readable recording medium, and may be constituted by at least one of, for example, an optical disc such as a compact disc ROM (CD-ROM), a hard disk drive, a flexible disk, a magnetooptic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including the memory 1002 and/or the storage 1003, a server, or another suitable medium.

The communication device 1004 is hardware (transmitting and receiving device) for performing communication between computers through a wired and/or wireless network, and is also referred to as, for example, a network device, a network controller, a network card, a communication module, or the like. For example, each function of the dialogue device 20 described above may be realized by the communication device 1004.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be constituted by a single bus, or may be constituted by a different bus between devices.

In addition, the dialogue device 20 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, at least one of these types of hardware may be mounted in the processor 1001.

Hereinbefore, the present embodiments have been described in detail, but it is apparent to those skilled in the art that the present embodiments should not be limited to the embodiments described in this specification. The present embodiments can be implemented as modified and changed aspects without departing from the spirit and scope of the present invention, which are determined by the description of the scope of claims. Therefore, the description of this specification is intended for illustrative explanation only, and does not impose any limited interpretation on the present embodiments.

Notification of information is not limited to the aspects/embodiments described in this specification, and may be performed using other methods. For example, the notification of information may be performed by physical layer signaling (such as downlink control information (DCI) or uplink control information (UCI)), upper layer signaling (such as radio resource control (RRC) signaling, medium access control (MAC) signaling, or broadcast information (such as a master information block (MIB) and a system information block (SIB)), other signals, or combinations thereof. In addition, the RRC signaling may be referred to as an RRC message and may be referred to as, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-F1), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this specification may be changed as long as they are compatible with each other. For example, in the methods described in this specification, various steps as elements are described in an exemplary order but the methods are not limited to the described specific order.

A specific operation which is performed by a specific device in this specification may be performed by an upper node with respect thereto in some cases. For example, in a case where the specific device is a base station, in a network constituted by one or a plurality of network nodes including the base station, it is obvious that various operations which are performed to communicate with a terminal can be performed by the base station and/or other network nodes other than the base station (for example, an MME or an S-GW can be conceived but the network nodes are not limited thereto). A case in which the number of network nodes other than the base station is one has been described above, but a combination of a plurality of different network nodes (for example, an MME and an S-GW) may be used.

Information or the like can be output from an upper layer (or a lower layer) to a lower layer (or an upper layer). Information or the like may be input or output via a plurality of network nodes.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Information, a signal or the like described in this specification may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in this specification and/or the terms required for understanding this specification may be substituted by terms having the same or similar meanings. For example, a channel and/or a symbol may be a signal. In addition, the signal may be a message. In addition, a component carrier (CC) may be referred to as a carrier frequency, a cell, or the like. The terms "system" and "network" which are used in this specification are used interchangeably.

In addition, information, parameters, and the like described in this specification may be expressed as absolute values, may be expressed by values relative to a predetermined value, or may be expressed by other corresponding information. For example, radio resources may be indicated by indices.

Names which are used for the parameters are not restrictive from any viewpoint. Further, expressions or the like using the parameters may be different from the expressions which are explicitly disclosed in this specification. Since various channels (for example, a PUCCH or a PDCCH) and information elements (for example, a TPC) can be distinguished by any appropriate name, various names given to various channels and information elements are not restrictive from any viewpoint.

A mobile communication terminal may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The term "determining" which is used in this specification may include various types of operations. The term "determining" may include regarding operations such as, for example, judging, calculating, computing, processing, deriving, investigating, looking up (for example, looking up in a table, a database or a separate data structure), or ascertaining as an operation such as "determining" In addition, the term "determining" may include regarding operations such as receiving (for example, receiving information), transmitting (for example, transmitting information), input, output, or accessing (for example, accessing data in a memory) as an operation such as "determining" In addition, the term "determining" may include regarding operations such as resolving, selecting, choosing, establishing, or comparing as an operation such as "determining" That is, the term "determining" may include regarding some kind of operation as an operation such as "determining."

The terms "connected" and "coupled" and every modification thereof refer to direct or indirect connection or coupling between two or more elements and can include that one or more intermediate element is present between two elements "connected" or "coupled" to each other. The coupling or connecting of elements may be physical, may be logical, or may be a combination thereof. In this specification, two elements can be considered to be "connected" or "coupled" to each other when one or more electrical wires, cables, and/or printed electric connections are used or by using electromagnetic energy such as electromagnetic energy having wavelengths in a radio frequency range, a microwave area, and a light (both visible light and invisible light) area as non-restrictive and non-comprehensive examples.

An expression "on the basis of ~" which is used in this specification does not refer to "on the basis of only ~," unless otherwise described. In other words, the expression "on the basis of ~" refers to both "on the basis of only ~" and "on the basis of at least ~."

Any reference to elements having names such as "first" and "second" which are used in this specification does not generally limit amounts or an order of the elements. The terms can be conveniently used to distinguish two or more elements in this specification.

Accordingly, reference to first and second elements does not mean that only two elements are employed or that the first element has to precede the second element in any form.

Insofar as the terms "include" and "including" and modifications thereof are used in this specification or the claims, these terms are intended to have a comprehensive meaning similarly to the term "comprising." Further, the term "or" which is used in this specification or the claims is intended not to mean an exclusive logical sum.

In this specification, a single device is assumed to include a plurality of devices unless only one device may be present in view of the context or the technique. In the entire disclosure, a singular form is intended to include a plural form unless the context indicates otherwise.

REFERENCE SIGNS LIST

1 Dialogue system, 22 Keyword acquisition unit, 23 Category generation unit, 24 Ranking determination unit, 26 Presentation unit, 30 FAQ database (storage unit)

The invention claimed is:

1. A dialogue system configured to perform a response for prompting a user to make an additional input with respect to the user's input of a character string and determine a resulting sentence corresponding to the user's input, the system comprising:
processing circuitry configured to
store, in a memory, resulting sentence candidates which are candidates of the resulting sentence, a storage key group containing one or a plurality of stored keywords associated with the resulting sentence candidates, and a fluctuation dictionary that stores a stored keyword and a fluctuation notation for the stored keyword in association with each other;
acquire an input key group containing one or a plurality of input keywords associated with the character string on the basis of the input of the character string;
determine a priority ranking of the resulting sentence candidates on the basis of a degree of coincidence between the input key group and the storage key group; and
select a resulting sentence candidate of a determined highest priority ranking and present a response for prompting the user to make an additional input on the basis of the selected resulting sentence candidate,
wherein, in a case where there is the stored keyword which is in a predetermined correspondence relation with the character string, the processing circuitry acquires the input keyword obtained by adding additional information to the stored keyword indicating a fluctuation notation of a stored keyword is added to the input keyword such that the input keyword is a fluctuation keyword, and
in a case where the additional information is added to the acquired input keyword, the processing circuitry reduces an influence of the input keyword to which the additional information is added on the degree of coincidence.

2. The dialogue system according to claim 1, wherein the processing circuitry
defines the input keyword coincident with the storage key group in the input key group as a match key, and determines the degree of coincidence on the basis of match number information which is information according to the number of match keys, and
in a case where the input keyword to which the additional information is added is counted as the match key, reduces an influence of one input keyword on the match number information more than in a case where the input keyword to which the additional information is not added is counted as the match key.

3. The dialogue system according to claim 1, wherein the processing circuitry defines the input keyword of the input key group acquired in excess with respect to the storage key group as an excess key, and determines the degree of coincidence on the basis of information including the number of excess keys when the input keyword to which the additional information is added is excluded.

4. The dialogue system according to claim 1, wherein, when a reply that indicates negation is input by a user in a case where the input keyword to which the additional information is added is contained in a response for prompting the additional input, the processing circuitry deletes the input keyword to which the additional information is added from the input key group.

5. The dialogue system according to claim 2, wherein the processing circuitry defines the input keyword of the input key group acquired in excess with respect to the storage key group as an excess key, and determines the degree of coincidence on the basis of information including the number of excess keys when the input keyword to which the additional information is added is excluded.

6. The dialogue system according to claim 2, wherein, when a reply that indicates negation is input by a user in a case where the input keyword to which the additional information is added is contained in a response for prompting the additional input, the processing circuitry deletes the input keyword to which the additional information is added from the input key group.

7. A method, implemented by processing circuitry of a dialogue system configured to perform a response for prompting a user to make an additional input with respect to the user's input of a character string and determine a resulting sentence corresponding to the user's input, the method comprising:
storing, in a memory, resulting sentence candidates which are candidates of the resulting sentence, a storage key group containing one or a plurality of stored keywords associated with the resulting sentence candidates, and a fluctuation dictionary that stores a stored keyword and a fluctuation notation for the stored keyword in association with each other;
acquiring an input key group containing one or a plurality of input keywords associated with the character string on the basis of the input of the character string;
determining a priority ranking of the resulting sentence candidates on the basis of a degree of coincidence between the input key group and the storage key group; and
selecting a resulting sentence candidate of a determined highest priority ranking and present a response for prompting the user to make an additional input on the basis of the selected resulting sentence candidate,
wherein, in a case where there is the stored keyword which is in a predetermined correspondence relation with the character string, the processing circuitry acquires the input keyword obtained by adding additional information to the stored keyword indicating a fluctuation notation of a stored keyword is added to the input keyword such that the input keyword is a fluctuation keyword, and in a case where the additional information is added to the acquired input keyword, the processing circuitry reduces an influence of the input keyword to which the additional information is added on the degree of coincidence.

8. A dialogue system according to claim 1, wherein the fluctuation notation is a character string which is in certain distance from the stored keyword, the distance being an index indicating how similar two character strings are to each other based on a degree of similarity of sounds, a degree of similarity of meanings, and a degree of similarity caused by an input method.

9. A dialogue system according to claim .1, wherein at least one fluctuation notation stored for at least one of the one or a plurality of stored keywords is an erroneous input pattern.

* * * * *